US006855255B2

(12) United States Patent
Horng et al.

(10) Patent No.: US 6,855,255 B2
(45) Date of Patent: Feb. 15, 2005

(54) METHOD FOR TREATING WASTEWATER/ WATER WITH FIXED-FILM MICROORGANISM ON POROUS CARRIERS

(75) Inventors: Ren-Yang Horng, Hsinchu (TW);
Wang-Kuan Chang, Hsinchu (TW);
Min-Chao Chang, Hsinchu (TW);
Wen-Yuang Tzou, Hsinchu (TW);
Ming-Jing Peng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 57 days.

(21) Appl. No.: 10/352,169

(22) Filed: Jan. 28, 2003

(65) Prior Publication Data

US 2004/0144720 A1 Jul. 29, 2004

(51) Int. Cl.[7] .............................. C02F 3/04; C02F 3/10
(52) U.S. Cl. ........................................ 210/617; 210/631
(58) Field of Search ................................. 210/610, 615, 210/616, 617, 631

(56) References Cited

U.S. PATENT DOCUMENTS 4,983,299 A * 1/1991 Lupton et al. .............. 210/617

* cited by examiner

Primary Examiner—Robert A. Hopkins
(74) Attorney, Agent, or Firm—Bacon & Thomas

(57) ABSTRACT

A method of wastewater/water treatment includes introducing an influent into a reactor so that a portion of contaminants in the influent is decomposed by microorganism in the reactor during a retention time of the influent in the reactor, and thus an effluent has a less amount of contaminants in comparison with the influent. The microorganism is grown fixedly on modified porous carriers in the reactor. The modified porous carrier contains a polymer foam and adsorbent particles entrapped in pores of the polymer foam, so that the modified foam not only has a large specific surface area, but also characteristics such as water affinity or an affinity to a certain type of contaminants. As a result, the efficiency of reducing contamination in the influent water is enhanced.

16 Claims, 1 Drawing Sheet

US 6,855,255 B2

METHOD FOR TREATING WASTEWATER/WATER WITH FIXED-FILM MICROORGANISM ON POROUS CARRIERS

FIELD OF THE INVENTION

The present invention relates generally to a biological treatment of wastewater/water, and more particularly to a method for treating wastewater/water with microorganism which is grown fixedly on a porous carrier.

BACKGROUND OF THE INVENTION

The biological treatment of water/wastewater is generally divided into a suspension growth method and a fixed-film growth method. Such a classification is based on the form by which the microorganism is grown for that purpose. Both the suspension growth method and the fixed-film growth method are widely used nowadays; nevertheless the latter has advantages over the former under the circumstances that the sludge retention time (SRT) is relatively longer, and that the hydraulic retention time (HRT) is relatively shorter. In addition, the fixed-film growth method is generally suggested for a water/wastewater treatment which involves the removal of a special contaminant from the water/wastewater due to its longer SRT. In terms of the microbial growth and the decomposition of contaminants, there are two kinds of carriers: immobilized carrier and fixed-film carrier. The immobilized carrier is a biological carrier in which a pre-incubated microorganism is made immobile in the carrier; it is used only in certain special circumstances in light of its high cost. The fixed-film carrier is relatively cost-effective and is widely used in environmental engineering. The early fixed-film carrier is formed of a corrugated board of a plastic material and is used widely due to its physical stability and its accessibility. However, the usage of the early fixed-film carrier calls for the construction of a relatively large reactor, because the plastic corrugated board has a small specific surface area ranging from 100 to 200 $m^2/m^3$. Needless to say, the construction of the large reactor results in a substantial increase in the overall cost of the water/wastewater treatment. In addition, a relatively long start-up period of the early fixed-film carrier gives an added cost to the water/wastewater treatment. The long start-up period is resulted from the fact that the fixed growth of the microorganism on the early fixed-film carrier takes place at a slow pace.

In view of the deficiencies of the conventional fixed-film carrier described above, a fixed-film growth of microorganism on a porous carrier was introduced. The porous carrier has a specific surface area of 1000 $m^2/m^3$ or greater. As a result, the reactor can be greatly reduced in volume. In addition, the porous carrier is capable of trapping and intercepting the microorganism efficiently, so as to shorten the start-up period of the water/wastewater treatment. However, the porous carrier is generally hydrophobic in nature and has tendency to float in water/wastewater. Moreover, the porous carrier is incapable of effective adsorption of certain contaminants, such as compounds containing an ammonia, as well as certain contaminants which cause color of wastewater. As a result, the microbiological decomposition of the contaminants can not be effectively carried out in the reactor.

SUMMARY OF THE INVENTION

The primary objective of the present invention is to provide a porous carrier which is free of the deficiencies of the conventional porous carriers described above.

It is another objective of the present invention to provide a method for treating wastewater/water by means of the porous carrier of the present invention.

In accordance with nature of the water to be treated, the porous carrier of the present invention is modified in such a manner that it maintains its original large specific surface area, and that it has characteristics such as hydrophilic and an affinity to adsorb the contaminants. The modification of the biological porous carrier of the present invention is attained by using a polymer foam as a matrix, and adsorbent particles which are mixed with the polymer foam in an aqueous solution by mechanical agitation or by an aerating device, thereby resulting in entrapment of adsorbent particles in pores of the polymer foam. The surface hydrophone of the porous carrier can be changed by an addition of diatomite to the porous carrier, so that the surface of the porous carrier becomes hydrophilic. As a result, the porous carrier is bound to stay submerged in water/wastewater. Such a surface modification as described above is attained without the use of such chemical substance as butyl acetate. Zeolite may be added to the porous carrier so that the adsorption of ammonia and/or nitrogen-containing compounds to the porous carrier can be enhanced, when an influent contains this kind of contaminants. The ammonia and the nitrogen-containing compounds are then converted by the nitrifying microorganism into nitrate nitrogen, which can be easily removed from the water/wastewater. An addition of activated carbon to the porous carrier can serve to enhance the removal of color of the wastewater.

The advantages of the porous carrier of the present invention are therefore apparent. In the first place, the present invention shortens the start-up preparation of the water/wastewater treatment and reduces the volume of the water/wastewater treating reactor, thereby resulting in a relatively shorter hydraulic retention time (HRT). The porous carrier of the present invention has an excellent affinity for contaminants, and an improved hydrophile enabling the porous carrier to stay submerged in the water/wastewater. The present invention is capable of effective removal of a specific contaminant from the wastewater by a modified porous carrier in which a specific adsorbent is entrapped. The fast regeneration of the microorganism is made possible by the present invention. In short, the present invention is efficient and cost-effective.

DETAILED DESCRIPTION OF THE PREFERRED EMBODIMENTS

Figure 1:
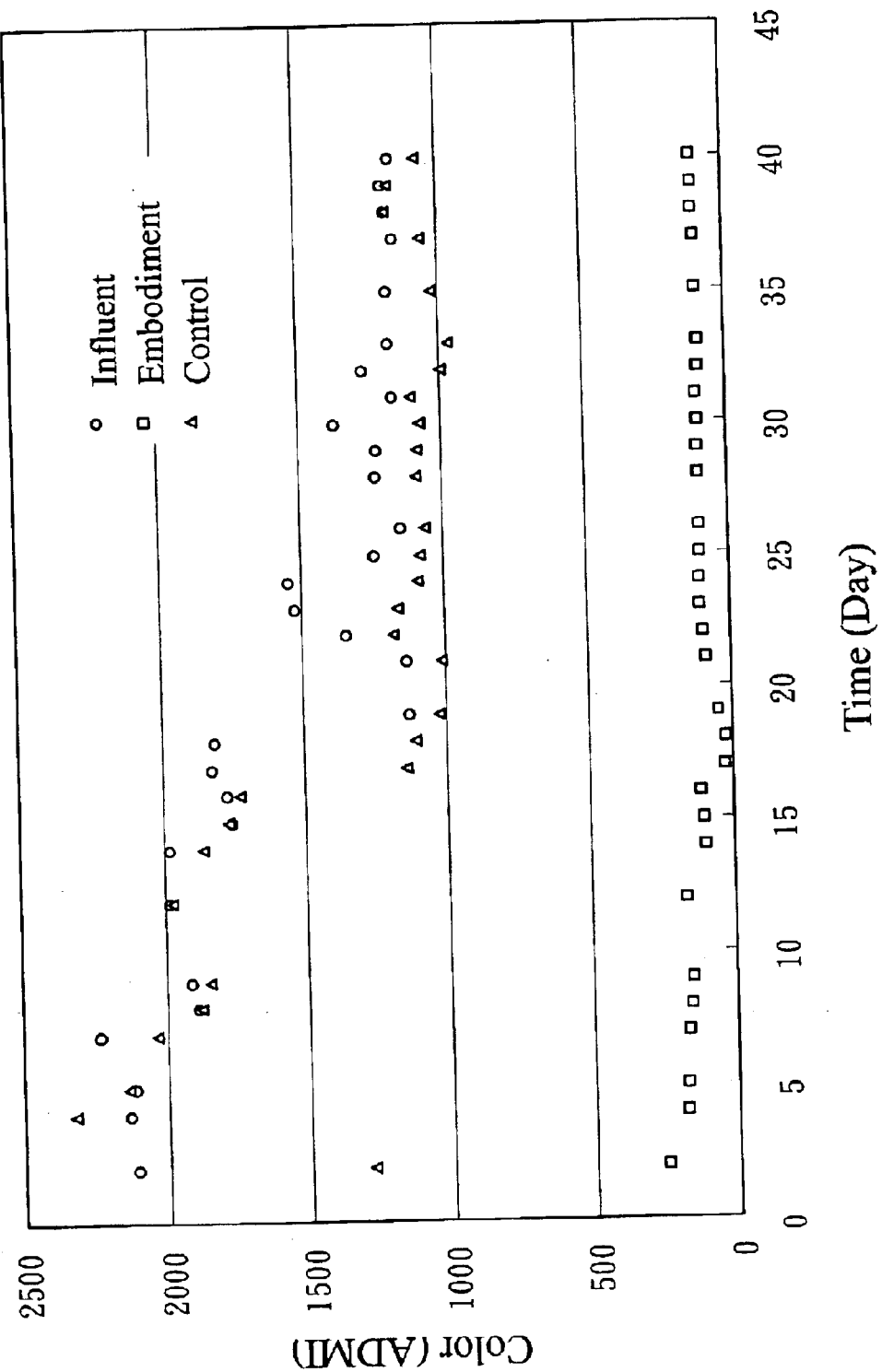
FIG. 1 shows a diagram comparing the results of a preferred embodiment of the present invention with those of a control example, with the horizontal axis denoting the duration (day) and the vertical axis denoting the water color value based on American Dye Manufacturers Institute (ADMI), with circles denoting influent values, with squares denoting values of the preferred embodiment of the present invention, and with triangles denoting values of the control example.

The present invention discloses a method of wastewater/water treatment comprising introducing an influent into a reactor so that a portion of contaminants in the influent is decomposed by microorganism in the reactor during a retention time of the influent in the reactor, and thus an effluent has a less amount of contaminants in comparison with the influent, wherein the improvement comprises the microorganism is grown on a modified porous carrier in the reactor, said modified porous carrier comprising a polymer foam and adsorbent particles entrapped in pores of the polymer foam.

Preferably, said polymer foam has a density ranging from 10 kg/m³ to 60 kg/m³, and a porosity ranging from 30% to 100%; and wherein said adsorbent particles have a size ranging from 0.1 to 60 meshes.

Preferably, said modified porous carrier contains 1–100% of said adsorbent particles, based on the weight of the polymer foam.

Preferably, wherein said polymer foam is a polyurethane foam; wherein said adsorbent particles are activated carbon particles, diatomite particles, or zeolite particles.

Preferably, said polymer foam and said adsorbent particles are mixed together in an aqueous solution such that said adsorbent particles are entrapped in the pores of the polymer foam. More preferably, said aqueous solution is said influent introduced in said reactor, and said mixing is driven by bubbles created in a bottom of said reactor.

Preferably, said influent contains ammonia and/or nitrogen-containing compounds, and said adsorbent particles are zeolite particles.

Preferably, said influent has a color which is two times or more greater than that of the effluent; wherein said adsorbent particles are activated carbon particles.

Preferably, said modified porous carrier is a cubic or spherical body having a volume ranging from 8 to 125 cm³, wherein said reactor contains a plurality of said modified porous carrier, so that a total volume of said plurality of said modified porous carrier is about 80% of a capacity of the reactor.

A preferred embodiment of the present invention is described hereinafter along with the control example.

The embodiment involves the use of two sets of reactors made of polyacrylate. Each reactor had a diameter of 6 cm, a height of 60 cm, an effective depth of 50 cm, and an effective volume of 1.4 L. The reactor was provided at the bottom with an aerating device (flow rate=1.0 L air/min) for supplying an aqueous solution contained in the reactor with oxygen.

The porous carriers used were polyurethane (PU) foams. Each carrier had a dimension of 1 cm*1 cm*1 cm, and a volume of 1 cm³. The properties of the PU foam carriers are shown in the following Table 1. Identical number of porous carriers were added to the two reactors with the addition amount being about 80% of the reactor volume, i.e. about 1000 pieces of porous carriers per reactor. One of the two reactors was provided therein with 5 g of activated carbon powder (the embodiment), which other one of the two reactors was devoid of the activated carbon (the control example). The activated carbon powder was added in the midst of the addition of the porous carriers into the reactor, which was added at the time when the height of the added porous carriers reached ⅕ of the reactor height. As an influent was introduced into the reactor, the activated carbon powder was driven by the power of the air bubbles from the aerating device, so that it was entrapped in the pores of the PU foam carriers. The specifications of the activated carbon are shown in Table 2. The microorganism was seeded in the two reactors. Each reactor was provided with 2100 mg of sludge, which formed a sludge concentration of 1500 mg/L. The influent was introduced from the bottom of the reactor such that the influent was circulated in the reactor for one day, so as to complete the seeding and growing and of the microorganism. Upon completion of the seeding of the microorganism, the experiment was carried out, with the conditions of the experiment being listed in Table 3.

The influents of the preferred embodiment and the control example were synthetic wastewater, which were prepared with AO-7 as a primary component, and a minute amount of urea, phosphorates, and ferric chloride. The constituents of the synthetic wastewater are listed in Table 4.

On the basis of FIG. 1, it is readily apparent that the wastewater color of the preferred embodiment is effectively reduced, with the wastewater color being reduced from 1000–2500 ADMI to less than 550 ADMI which is under a standard value required by the local discharge standards. In the control example, the color of the influent remains. In other words, the influent and the effluent of the control example are almost identical to each other in terms of watercolor.

TABLE 1

Basic Properties of PU Foam Carrier

| Item | Density | Tension strength | Elongation rate |
|---|---|---|---|
| Range | 28 ± 5 (kg/m³) | 0.8~0.84 (kg/cm²) | 240%~250% |

TABLE 2

Specifications of Activated Carbon Powder

| Item | Unit | Value/Range |
|---|---|---|
| Particle size | Mesh | 24 |
| Iodine value | Mg/g | >=1000 |
| Benzene adsorption | Mg/g | >450 |
| Specific surface area | m²/g | 900~1100 |
| Strength | % | 90 |

TABLE 3

Experimental Conditions

| | Control example | Preferred embodiment |
|---|---|---|
| Amount of addition of PU foam (pieces) | 1100 | 1100 |
| Air flow rate (L/min) | 1.0 | 1.0 |
| Initial sludge concentration (mg/L) | 1500 | 1500 |
| Amount of addition of activated carbon (g) | 0 | 5 |
| HRT (hour) | 12 | 12 |

TABLE 4 constituents of synthetic wastewater

| Constituent | Wastewater 50 L Wastewater |
|---|---|
| AO-7 | 50000–125000 ADMI |
| Nutrient source | 2–6 ml |
| Nutrient source (COD 6000 mg/L addition of 2 ml/L) | |
| Urea | 160.5 g/L |
| KH₂PO₄ (K₂HPO₄) | 70 g/L (84 g) |
| FeCl₃.6H₂O | 36 g/L |

What is claimed is:

1. A method of wastewater/water treatment comprising introducing an influent into a reactor so that a portion of contaminants in the influent is decomposed by microorganism in the reactor during a retention time of the influent in the reactor, and thus an effluent has a less amount of contaminants in comparison with the influent, wherein the improvement comprises the microorganism is grown on a modified porous carrier in the reactor, said modified porous carrier comprising a polymer foam and adsorbent particles entrapped in pores of the polymer foam; wherein said influent contains ammonia and/or nitrogen-containing compounds, and said adsorbent particles are zeolite particles.

2. The method as defined in claim 1, wherein said polymer foam has a density ranging from 10 kg/m$^3$ to 60 kg/m$^3$, and a porosity ranging from 30% to 100%; and wherein said adsorbent particles have a size ranging from 0.1 to 60 meshes.

3. The method as defined in claim 1, wherein said modified porous carrier contains 1–100% of said adsorbent particles, based on the weight of the polymer foam.

4. The method as defined in claim 1, wherein said polymer foam is a polyurethane foam; wherein said adsorbent particles are activated carbon particles, diatomite particles, or zeolite particles.

5. The method as defined in claim 1, wherein said polymer foam and said adsorbent particles are mixed together in an aqueous solution such that said adsorbent particles are entrapped in the pores of the polymer foam.

6. The method as defined in claim 5, wherein said aqueous solution is said influent introduced in said reactor, and said mixing is driven by bubbles created in a bottom of said reactor.

7. The method as defined in claim 1, wherein said influent has a color which is two times or more greater than that of the effluent; wherein said adsorbent particles are activated carbon particles.

8. The method as defined in claim 1, wherein said modified porous carrier is a cubic or spherical body having a volume ranging from 8 to 125 cm$^3$, wherein said reactor contains a plurality of said modified porous carrier, so that a total volume of said plurality of said modified porous carrier is about 80% of a capacity of the reactor.

9. A method of wastewater/water treatment comprising introducing an influent into a reactor so that a portion of contaminants in the influent is decomposed by microorganism in the reactor during a retention time of the influent in the reactor, and thus an effluent has a less amount of contaminants in comparison with the influent, wherein the improvement comprises the microorganism is grown on a modified porous carrier in the reactor, said modified porous carrier comprising a polymer foam and adsorbent particles entrapped in pores of the polymer foam; wherein said influent contains ammonia and/or nitrogen-containing compounds, and said adsorbent particles are zeolite particles, wherein said polymerfoam and said adsorbent particles are mixed together in an aqueous solution such that said adsorbent particles are entrapped in the pores of the polymer foam, and wherein said aqueous solution is said influent introduced in said reactor, and said mixing is driven by bubbles created in a bottom of said reactor.

10. The method as defined in claim 9, wherein said polymer foam has a density ranging from 10 kg/m$^3$ to 60 kg/m$^3$, and a porosity ranging form 30% to 100%; and wherein said adsorbent particles have a size ranging from 0.1 to 60 meshes.

11. The method as defined in claim 9, wherein said modified porous carrier contains 1–100% of said adsorbent particles, based on the weight of the polymer foam.

12. The method as defined in claim 9, wherein said polymer foam is a polyurethane foam; wherein said adsorbent particles are activated carbon particles, diatomite particles, or zeolite particles.

13. The method as defined in claim 9, wherein said polymer foam and said adsorbent particles are mixed together in an aqueous solution such that said adsorbent particles are entrapped in the pores of the polymer foam.

14. The method as defined in claim 9, wherein said aqueous solution is said influent introduced in said reactor, and said mixing is driven by bubbles created in a bottom of said reactor.

15. The method as defined in claim 9, wherein said influent has a color which is two times or more greater than that of the effluent; wherein said adsorbent particles are activated carbon particles.

16. The method as defined in claim 9, wherein said modified porous carrier is a cubic or spherical body having a volume ranging from 8 to 125 cm$^3$, wherein said reactor contains a plurality of said modified porous carrier, so that a total volume of said plurality of said modified porous carrier is about 80% of a capacity of the reactor.

* * * * *